United States Patent
Liang et al.

(10) Patent No.: US 9,597,668 B2
(45) Date of Patent: Mar. 21, 2017

(54) SELECTIVE NICKEL BASED HYDROGENATION CATALYST AND THE PREPARATION THEREOF

(71) Applicant: PETROCHINA COMPANY LIMITED, Beijing (CN)

(72) Inventors: Shunqin Liang, Gansu (CN); Ying Qian, Gansu (CN); Longgang Lv, Gansu (CN); Limin Sun, Gansu (CN); Yundi Zheng, Gansu (CN); Tinghai Wang, Gansu (CN); Jie Wu, Gansu (CN); Fengxia Cao, Gansu (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 228 days.

(21) Appl. No.: 14/456,858

(22) Filed: Aug. 11, 2014

(65) Prior Publication Data

US 2014/0349844 A1  Nov. 27, 2014

Related U.S. Application Data

(62) Division of application No. 12/741,017, filed as application No. PCT/CN2008/001781 on Oct. 22, 2008, now abandoned.

(30) Foreign Application Priority Data

Nov. 1, 2007 (CN) .......................... 2007 1 0176670

(51) Int. Cl.
| | |
|---|---|
| *B01J 23/888* | (2006.01) |
| *B01J 21/12* | (2006.01) |
| *B01J 23/83* | (2006.01) |
| *B01J 23/85* | (2006.01) |
| *B01J 23/86* | (2006.01) |
| *B01J 23/887* | (2006.01) |
| *B01J 35/10* | (2006.01) |
| *B01J 37/02* | (2006.01) |
| *B01J 21/04* | (2006.01) |
| *B01J 23/78* | (2006.01) |
| *B01J 37/00* | (2006.01) |

(52) U.S. Cl.
CPC ............ *B01J 23/888* (2013.01); *B01J 21/12* (2013.01); *B01J 23/83* (2013.01); *B01J 23/85* (2013.01); *B01J 23/866* (2013.01); *B01J 23/8871* (2013.01); *B01J 23/8872* (2013.01); *B01J 35/1014* (2013.01); *B01J 35/1019* (2013.01); *B01J 35/1038* (2013.01); *B01J 35/1042* (2013.01); *B01J 37/024* (2013.01); *B01J 37/0207* (2013.01); *B01J 21/04* (2013.01); *B01J 23/78* (2013.01); *B01J 37/0009* (2013.01); *C10G 2400/02* (2013.01)

(58) Field of Classification Search
CPC ... B01J 23/83; B01J 23/85; B01J 23/86; B01J 23/78; B01J 23/866; B01J 23/8871; B01J 23/8872; B01J 23/888; B01J 23/887; B01J 21/12; B01J 21/04; B01J 35/1014; B01J 35/1019; B01J 35/1038; B01J 35/1042; B01J 37/0207; B01J 37/024; B01J 37/0009

See application file for complete search history.

(56) References Cited

U.S. PATENT DOCUMENTS

| | | |
|---|---|---|
| 3,472,763 A | 10/1969 | Cosyns et al. |
| 3,615,207 A | 10/1971 | Lee |
| 3,635,841 A | 1/1972 | Keith et al. |
| 3,899,444 A | 8/1975 | Stephens |
| 4,000,207 A | 12/1976 | Kaiser |
| 4,119,567 A | 10/1978 | Bartsch |
| 4,220,559 A | 9/1980 | Polinski |
| 4,237,030 A | 12/1980 | Noguchi et al. |
| 4,390,456 A | 6/1983 | Sanchez et al. |
| 4,410,455 A | 10/1983 | Lambert |
| 4,469,816 A | 9/1984 | Armor et al. |
| 4,499,205 A | 2/1985 | Masuda |
| 4,835,131 A | 5/1989 | DeJong |
| 4,919,902 A | 4/1990 | Bricker et al. |

(Continued)

FOREIGN PATENT DOCUMENTS

| | | |
|---|---|---|
| CN | 85100761 | 9/1986 |
| CN | 1218822 | 6/1999 |

(Continued)

OTHER PUBLICATIONS

Liang et al (CN 1995290, published 2007 machine translation).*

(Continued)

*Primary Examiner* — Melvin C Mayes
*Assistant Examiner* — Smita Patel
(74) *Attorney, Agent, or Firm* — Knobbe, Martens, Olson & Bear, LLP

(57) ABSTRACT

A selective nickel-based hydrogenation catalyst and the preparation thereof, characterized in that: provided that the catalyst is weighed 100%, it comprises nickel oxide 14-20% as active component, lanthanum oxide and/or cerium oxide 2-8%, and VIB element oxide 1-8% as aids, 2-8% silica, 1-8% alkaline earth metal oxides, and alumina as the balance. The catalyst specific surface area is 60-150 $m^2/g$, and the pore volume is 0.4-0.6 ml/g. The catalyst has good hydrogenation performance, especially impurity and colloid resistance and hydrogenation stability. The catalyst can be applied to the diolefin selective hydrogenation of medium or low-distillate oil, especially of the full-distillates pyrolysis gasoline.

14 Claims, No Drawings

(56) References Cited

U.S. PATENT DOCUMENTS

| | | |
|---|---|---|
| 5,051,392 A | 9/1991 | Mabilon et al. |
| 5,258,558 A | 11/1993 | Arena et al. |
| 5,648,576 A | 7/1997 | Nguyen Than et al. |
| 6,054,409 A | 4/2000 | Nguyen Than et al. |
| 6,268,522 B1 | 7/2001 | Hagemeyer et al. |
| 6,350,717 B1 | 2/2002 | Frenzel et al. |
| 6,509,292 B1 | 1/2003 | Blankenship et al. |
| 6,518,213 B1 | 2/2003 | Yamamoto et al. |
| 6,528,453 B2 | 3/2003 | Baker et al. |
| 6,534,438 B1 | 3/2003 | Baker et al. |
| 6,576,586 B2 | 6/2003 | Siqin et al. |
| 6,797,669 B2 | 9/2004 | Zhang et al. |
| 6,806,382 B2 | 10/2004 | Baker et al. |
| 6,821,922 B1 | 11/2004 | Tacke et al. |
| 6,822,127 B2 | 11/2004 | Dai et al. |
| 6,936,568 B2 | 8/2005 | Blankenship et al. |
| 7,247,760 B2 | 7/2007 | Cheung et al. |
| 7,521,393 B2 | 4/2009 | Blankenship et al. |
| 7,902,104 B2 | 3/2011 | Kalck et al. |
| 8,067,334 B2 | 11/2011 | Hill et al. |
| 8,211,823 B2 | 7/2012 | Liang et al. |
| 8,236,726 B2 * | 8/2012 | Liu ................... B01J 23/8872 208/143 |
| 2006/0030482 A1 | 2/2006 | Ryu et al. |
| 2006/0178262 A1 | 8/2006 | Rokicki et al. |
| 2006/0217679 A1 | 9/2006 | Hanly et al. |

FOREIGN PATENT DOCUMENTS

| | | |
|---|---|---|
| CN | 1443829 | 9/2003 |
| CN | 1175931 | 11/2004 |
| CN | 1623655 | 6/2005 |
| CN | 1958155 | 5/2007 |
| CN | 1995290 | 7/2007 |
| CN | 101037613 | 9/2007 |
| JP | 8229392 | 9/1996 |
| KR | 20020061434 | 7/2002 |
| WO | 2008/040175 | 4/2008 |

OTHER PUBLICATIONS

Dong (CN101032699, published 2007, machine translation).*
WO/2008/040175 equivalent to US Pat. No. 8,236,726 B2 for English translation.*
International Search Report for PCT/CN2008/001781 dated Feb. 5, 2009.

* cited by examiner

SELECTIVE NICKEL BASED HYDROGENATION CATALYST AND THE PREPARATION THEREOF

INCORPORATION BY REFERENCE TO ANY PRIORITY APPLICATIONS

This application is a Divisional Application of U.S. application Ser. No. 12/741,017, filed, Aug. 5, 2010, now abandoned, which is U.S. National Phase of International Application No. PCT/CN2008/001781, filed Oct. 22, 2008, designating the United States, and published in Chinese as WO 2009/062386 on May 22, 2009, which claims priority to Chinese Patent Applications No. 200710176670.9, filed Nov. 1, 2007, all of which are hereby incorporated by reference under 37 CFR 1.57.

FIELD OF THE INVENTION

The present invention relates to a selective nickel-based hydrogenation catalyst and the preparation thereof. The catalyst is useful in selective hydrogenation of medium or low distillate oil, in particular, in the first-stage selective hydrogenation process of pyrolysis gasoline distillate.

BACKGROUND OF THE INVENTION

Pyrolysis gasoline is the by-product of steam cracking to make ethylene, which approximately comprises more than 50% of the production capacity of ethylene. Pyrolysis gasoline contains highly unsaturated hydrocarbons, such as diolefin, styrene and the like, which can be converted into corresponding monoolefin by selective hydrogenation. With the increasing ethylene production capability in China, the hydrogenation of pyrolysis gasoline has developed toward the hydrogenation of full distillate using nickel-based catalyst. Due to the variability of the pyrolysis gasoline raw materials and the differences in pyrolysis apparatus and pyrolysis modes, the pyrolysis gasoline raw materials are deteriorated, and the hydrogenation load and the content of impurity such as arsenic are increased, thereby causing the inferior performance of palladium-based catalyst for first-stage hydrogenation. For noble metal catalyst, its arsenic and colloid resistance as well as water resistance is low, since the impurity arsenic tends to occupy the empty orbital of Pd, and Pd is located on the surface layer of the catalyst with a content of only parts per thousand. For non-noble metal catalyst, it has certain arsenic tolerance and colloid and water resistance due to the structural difference and high metal content; moreover, it has relatively remarkable price advantage. Thus, there is need of the market and technical competition to develop a new nickel-based catalyst for first-stage hydrogenation of full distillate pyrolysis gasoline.

U.S. Pat. No. 3,472,763 reports a Ni/Al$_2$O$_3$ catalyst for the selective hydrogenation of diolefin, comprising 1-20% nickel as active component, 1-5% MoO$_3$ as aids, 1-5% alkali metal and alkaline earth metal as aids, and having a pore volume of more than 0.4 ml/g and a specific surface area of more than 30 m$^2$/g. This catalyst is prepared by impregnating the Al$_2$O$_3$ carrier with the aqueous solution of above-mentioned active component and aids. CN1218822A reports a Ni/Al$_2$O$_3$ catalyst suitable for the selective hydrogenation of pyrolysis gasoline distillates. This catalyst is prepared by loading nickel on alumina carrier comprising lithium or alkaline earth metal. However, this catalyst is not good at withstanding the hydrogenation load and its hydrogenation stability is to be improved.

An excellent selective hydrogenation catalyst should have higher hydrogenation activity and better selectivity. More importantly, it should have good stability. That is to say, it is necessary for such catalyst to have capability to resist impurity and colloid, thereby prolonging its lifetime.

SUMMARY OF THE INVENTION

The aim of the present invention is to develop a nickel-based Al$_2$O$_3$ supported catalyst for selective hydrogenation of diolefin. The catalyst has good hydrogenation performance, especially has good hydrogenation stability, and can be applied to the selective hydrogenation of full distillate pyrolysis gasoline.

The selective nickel-based hydrogenation catalyst of the present invention, with alumina as carrier, is characterized in that based on the total weight of the catalyst, it comprises:
  14-20% nickel oxide as active component;
  1-8% lanthanum oxide and/or cerium oxide;
  1-8% VIB group element oxide as aids;
  2-8% silica;
  1-8% alkaline earth metal oxide;
  wherein said catalyst has a specific surface area of 60-150 m$^2$/g and a pore volume of 0.4-0.6 ml/g. This catalyst is especially useful in the diolefin selective hydrogenation of medium or low distillate oil, in particular, in the diolefin selective hydrogenation of full distillate pyrolysis gasoline.

The present invention also provides a method for preparing such catalyst, comprising:
  adding silica or its precursor and alkaline earth metal oxide or its precursor into alumina carrier;
  calcinating at the temperature of 800-1100° C. for 3-6 hours to form the modified alumina carrier;
  adding the soluble salts of nickel, lanthanum and/or cerium and VIB group element into water;
  after fully dissolution, adjusting the pH of the solution to 4-5 to form an impregnating solution;
  impregnating the modified alumina carrier with the impregnating solution;
  drying at the temperature of 40-120° C.; and
  calcinating at the temperature of 350-450° C. for 3-6 hours, thereby obtaining the resultant catalyst.

In particular, the present invention preferably recommends that the modified alumina carrier is prepared by:
  adding silica sol, nitric acid and water into alumina hydrate (pseudo-boehmite);
  after kneading and extruding, drying at the temperature of 40-120° C.;
  calcinating at the temperature of 300-600° C. for 4-6 hours;
  impregnating the formed carrier with the impregnating solution formed by adding alkaline earth metal oxide into water;
  drying at the temperature of 40-120° C.; and
  calcinating at the temperature of 800-1100° C. for 4-6 hours, thereby forming the modified alumina carrier with desired physical properties.

The catalyst according to the present invention comprises 2-8% silica, which may increase the stability of the catalyst, especially the carrier during calcination. Preferably, the content of silica is 3-4%. Preferably, the content of nickel oxide is 15-19%.

The catalyst according to the present invention comprises alkaline earth metal, which may adjust the acidity of the catalyst after calcination and improve the colloid resistance during hydrogenation reaction. Preferably, the alkaline earth metal is magnesium and/or strontium. The content of alkaline earth metal oxide is preferably 2-5%.

The lanthanum and/or cerium are added in the form of nitrate dissolved in the impregnating solution so as to improve the hydrogenation activity and stability of the catalyst. Preferably, the content of lanthanum oxide and/or cerium oxide is 3-5%.

The VIB group element is added to improve the hydrogenation activity and impurity (for example, sulfur) resistance of the catalyst. Preferably, the VIB group element is one or more of Cr, Mo and W. The content of VIB group element oxide is preferably 3-6%.

The solution of the active component and aids are impregnated onto the resultant catalyst carrier in twice to increase the dispersity of the active component of the catalyst and improve the activity and stability of catalyst.

The compounds of nickel (as active component), magnesium, strontium lanthanum and cerium (as aids) in above-mentioned preparation process may be in the form of sulfate, nitrate and halide and so on. Preferably, they are in the form of nitrate, since nitrate is easily soluble in water to be fully dissolved and form stable solution.

The alumina hydrate, as the starting material for preparing the catalyst according to the present invention, may be alumina hydrates prepared by carbon dioxide method, ammonia method, and nitric acid method and so on. The alumina hydrate prepared by nitric acid method is preferable due to its better hydrogenation performance.

The catalyst according to the present invention should be reduced under hydrogen at the temperature of 350-400° C. for 5-10 hours prior to use. During the reduction, the volume ratio of hydrogen to catalyst is 150:1 to 500:1.

DETAILED DESCRIPTION OF THE INVENTION

Source of starting materials:

Nickel Nitrate: available from Xi'an Chemical Reagent Factory;

Magnesium nitrate and strontium nitrate: available from Shanghai Colloid Chemical Plant;

Cerium nitrate and lanthanum nitrate: available from Shensheng Reagent Factory, Fufeng, Yixing, Jiangsu;

alumina powder: available from Lanhua Xiangxin Additives Factory.

Example 1

140 ml water, 5 ml nitric acid (the content of which is 60%) and 16 ml silica sol (comprising 40% silica) are added to 300 g pseudo-boehmite alumina powder. After kneading and extruding, the formed alumina carrier is dried in air at 120° C., and then calcinated at 560° C. for 4 hours. 100 g calcinated carrier is impregnated with a solution form by dissolving 26 g magnesium nitrate into water, dried in air at 120° C., and calcinated at 1050° C. for 4 hours, thereby obtaining the modified $Al_2O_3$ carrier.

10 g nickel nitrate is added to 20 ml water with stirring. While stirring, 2.1 g cerium nitrate and 0.3 g ammonium molybdate are added. The pH of the solution is adjusted to 4. Then 10 g carrier is impregnated with the solution, aged for 12 hours, dried at 120° C., and calcinated at 400° C. for 4 hours, thereby obtaining the catalyst.

Comparative Example 1

140 ml water and 5 ml nitric acid (the content of which is 60%) are added to 300 g pseudo-boehmite alumina powder. After kneading and extruding, the formed alumina carrier is dried in air at 120° C., and then calcinated at 560° C. for 4 hours. 100 g calcinated carrier is impregnated with a solution formed by dissolving 16.7 g magnesium nitrate and 3 g strontium nitrate into water, dried in air at 120° C., and calcinated at 1050° C. for 4 hours, thereby obtaining the $Al_2O_3$ carrier.

10 g nickel nitrate is added to 20 ml water with stirring. While stirring, 2.1 g cerium nitrate and 0.3 g ammonium molybdate are added. The pH of the solution is adjusted to 4. Then 10 g carrier is impregnated with the solution, aged for 12 hours, dried at 120° C., and calcinated at 400° C. for 4 hours, thereby obtaining the catalyst.

Example 2

140 ml water, 5 ml nitric acid (the content of which is 60%) and 14 ml silica sol (comprising 40% silica) are added to 300 g pseudo-boehmite alumina powder. After kneading and extruding, the formed alumina carrier is dried in air at 120° C., and then calcinated at 460° C. for 4 hours. 100 g calcinated carrier is impregnated with a solution formed by dissolving 20 g magnesium nitrate and 3.5 g strontium nitrate into water, dried in air at 120° C., and calcinated at 1000° C. for 4 hours, thereby obtaining the $Al_2O_3$ carrier.

8.6 g nickel nitrate is added to 20 ml water with stirring. While stirring, 1.5 g lanthanum nitrate and 0.6 g ammonium tungstate are added. The pH of the solution is adjusted to 4. Then 10 g carrier is impregnated with the solution, aged for 12 hours, dried at 120° C., and calcinated at 350° C. for 4 hours, thereby obtaining the catalyst.

Comparative Example 2

140 ml water, 5 ml nitric acid (the content of which is 60%) and 14 ml silica sol (comprising 40% silica) are added to 300 g pseudo-boehmite alumina powder. After kneading and extruding, the formed alumina carrier is dried in air at 120° C., and calcinated at 1000° C. for 4 hours, thereby obtaining the $Al_2O_3$ carrier.

8.6 g nickel nitrate is added to 20 ml water with stirring. While stirring, 1.5 g lanthanum nitrate and 0.6 g ammonium tungstate are added. The pH of the solution is adjusted to 4. Then 10 g carrier is impregnated with the solution, aged for 12 hours, dried at 120° C., and calcinated at 350° C. for 4 hours, thereby obtaining the catalyst.

Example 3

140 ml water, 5 ml nitric acid (the content of which is 60%) and 9 ml silica sol (comprising 40% silica) are added to 300 g pseudo-boehmite alumina powder. After kneading and extruding, the formed alumina carrier is dried in air at 120° C., and then calcinated at 460° C. for 4 hours. 100 g calcinated carrier is impregnated with a solution formed by dissolving 15.5 g magnesium nitrate into water, dried in air at 120° C., and calcinated at 1030° C. for 4 hours, thereby obtaining the $Al_2O_3$ carrier.

7.9 g nickel nitrate is added to 20 ml water with stirring. While stirring, 0.63 g cerium nitrate, 0.62 g lanthanum nitrate and 0.5 g ammonium tungstate are added. The pH of the solution is adjusted to 4. Then 10 g carrier is impregnated with the solution, aged for 12 hours, dried at 120° C., and calcinated at 400° C. for 4 hours, thereby obtaining the catalyst.

Comparative Example 3

140 ml water is added to 300 g pseudo-boehmite alumina powder. After kneading and extruding, the formed alumina carrier is dried in air at 120° C., and calcinated at 1030° C. for 4 hours, thereby obtaining the $Al_2O_3$ carrier.

7.9 g nickel nitrate is added to 20 ml water with stirring. While stirring, 0.6 g ammonium molybdate is added. The pH of the solution is adjusted to 4. Then 10 g carrier is impregnated with the solution, aged for 12 hours, dried at 120° C., and calcinated at 400° C. for 4 hours, thereby obtaining the catalyst.

Example 4

140 ml water, 5 ml nitric acid (the content of which is 60%) and 12 ml silica sol (comprising 40% silica) are added to 300 g pseudo-boehmite alumina powder. After kneading and extruding, the formed alumina carrier is dried in air at 120° C., and then calcinated at 460° C. for 4 hours. 100 g calcinated carrier is impregnated with a solution formed by dissolving 5.8 g strontium nitrate into water, dried in air at 120° C., and calcinated at 1020° C. for 4 hours, thereby obtaining the $Al_2O_3$ carrier.

9.5 g nickel nitrate is added to 20 ml water with stirring. While stirring, 1.1 g cerium nitrate, 1.1 g lanthanum nitrate and 0.6 g potassium chromate are added. The pH of the solution is adjusted to 4. Then 10 g carrier is impregnated with the solution, aged for 12 hours, dried at 120° C., and calcinated at 350° C. for 4 hours, thereby obtaining the catalyst.

Comparative Example 4

140 ml water, 5 ml nitric acid (the content of which is 60%) and 12 ml silica sol (comprising 40% silica) are added to 300 g pseudo-boehmite alumina powder. After kneading and extruding, the formed alumina carrier is dried in air at 120° C., and then calcinated at 460° C. for 4 hours. 100 g calcinated carrier is impregnated with a solution formed by dissolving 21.6 g magnesium nitrate into water, dried in air at 120° C., and calcinated at 1020° C. for 4 hours, thereby obtaining the $Al_2O_3$ carrier.

9.5 g nickel nitrate is added to 20 ml water with stirring. While stirring, 1.1 g cerium nitrate is added. The pH of the solution is adjusted to 4. Then 10 g carrier is impregnated with the solution, aged for 12 hours, dried at 120° C., and calcinated at 350° C. for 4 hours, thereby obtaining the catalyst.

INDUSTRIAL APPLICABILITY

Analysis Method

Distillation range of oil products: measured according to Petroleum Product Testing Method SYB-2110-60;

Iodine value: measured according to IC1 method, expressed in g $I_2$/100 g oil;

Diolefin: measured according to maleic anhydride method, expressed in g $I_2$/100 g oil;

Arsenic content: measured by DV-4300 atomic emission spectroscopy;

Sulfur content: measured by WK-2B microcoulometric detector;

Colloid: measured according to Petroleum Product Testing Method SYB-2103-60.

The full distillate pyrolysis gasoline is used as the starting materials, the properties of which are shown in Table 1. The catalysts of Examples 1, 2, 3 and 4 as well as Comparative Examples 1, 2, 3 and 4 are evaluated on 100 ml adiabatic bed hydrogenation apparatus. Firstly, the catalyst is reduced under hydrogen at the temperature of 350-400° C. for 10 hours. The temperature is lowered to 60° C. After the catalyst is inactivated by cyclohexane containing 1000 ppm dimethyl disulfide for 2 hours, the raw oil is added.

Reaction Condition

Reaction pressure: 2.8 MPa,

Intake temperature: room temperature ~60° C.,

Air speed of fresh raw oil: 3.5 $h^{-1}$,

The volume ratio of hydrogen to oil: 200:1 (based on the fresh oil).

The evaluation is carried out for 200 hours. And the iodine value and diolefin of the products are analyzed every 6 hours. The average data of the iodine value and diolefin of the product for each catalyst during the 200-hour evaluation are shown in Table 2.

TABLE 1

Indexes of hydrogenation raw oil ($C_5$-$C_9$)

| Color | Iodine value × $10^{-2}$ (g/g) | Diolefin × $10^{-2}$ (g/g) | Distillation range (° C.) | Sulfur content (ppm) | Colloid × $10^{-2}$ (mg/ml) | Density (g/ml) | Arsenic content (ppb) |
|---|---|---|---|---|---|---|---|
| Yellow | 89.2 | 38.5 | 45-205 | 96 | 6.0 | 0.815 | <20 |

TABLE 2

Catalyst composition and average data of 200-hour evaluation in every example and comparative example

| | Catalyst | | | | | | | |
|---|---|---|---|---|---|---|---|---|
| Index | Example 1 | Comparative Example 1 | Example 2 | Comparative Example 2 | Example 3 | Comparative Example 3 | Example 4 | Comparative example 4 |
| Product dioletin × $10^{-2}$ (g/g) | 1.0 | 1.18 | 0.8 | 1.82 | 0.9 | 1.18 | 0.95 | 1.15 |

TABLE 2-continued

Catalyst composition and average data of 200-hour evaluation in every example and comparative example

| Index | | Example 1 | Comparative Example 1 | Example 2 | Comparative Example 2 | Example 3 | Comparative Example 3 | Example 4 | Comparative example 4 |
|---|---|---|---|---|---|---|---|---|---|
| Product iodine value × $10^{-2}$ (g/g) | | 41.3 | 44.2 | 39.8 | 45.3 | 40.2 | 42.6 | 40.5 | 41.8 |
| The colloid content after 200 hours reaction % | | 6.1 | 5.9 | 5.8 | 7.5 | 6.2 | 8.6 | 6.5 | 6.8 |
| Specific surface area of the catalyst/m² · g$^{-1}$ | | 93.78 | 88.02 | 105.3 | 108.9 | 88.26 | 87.29 | 95.84 | 104.93 |
| Specific pore volume of the catalyst/cm³ · g$^{-1}$ | | 0.42 | 0.48 | 0.46 | 0.43 | 0.52 | 0.45 | 0.44 | 0.46 |
| Active component and aids content/wt % | Nickel oxide | 18.8 | 18.8 | 16.6 | 16.6 | 15.6 | 16.1 | 17.9 | 18.9 |
| | Silica | 4.3 | / | 3.7 | 3.7 | 2.4 | / | 3.2 | 3.2 |
| | Lanthanum oxide | / | / | 4.2 | 4.2 | 1.8 | / | 3.0 | / |
| | Cerium oxide | 6.1 | 6.1 | / | / | 1.9 | / | 3.2 | 3.4 |
| | Magnesium oxide | 3.9 | 2.4 | 2.9 | / | 2.4 | / | / | 3.3 |
| | Strontium oxide | / | 1.6 | 1.8 | / | / | / | 3.2 | / |
| | Molybdenum oxide | 1.7 | 1.7 | / | / | / | 3.9 | / | / |
| | Tungsten oxide | / | / | 3.8 | 3.8 | 3.3 | / | / | / |
| | Chromium oxide | / | / | / | / | / | / | 2.3 | / |

1000-hour long period evaluation is performed on the catalyst of Example 2. The evaluation was carried out on 100 ml adiabatic bed hydrogenation apparatus. Firstly, the catalyst is reduced under hydrogen at the temperature of 400-450° C. for 10 hours. The temperature is lowered to 60° C. After the catalyst is inactivated by cyclohexane containing 1000 ppm dimethyl disulfide for 3 hours, the raw oil is added.

Reaction condition:
Reaction pressure: 2.8 MPa,
Intake temperature: room temperature ~70° C.,
Air speed of fresh raw oil: 2.8 h$^{-1}$,
The volume ratio of hydrogen to oil: 200:1 (based on the fresh oil).

The iodine value and diolefin of the product are analyzed every 12 hours. The average data during every 200 hours are taken. The indexes of hydrogenation raw oil ($C_5$-$C_9$) are shown in Table 3.

TABLE 3

Indexes of hydrogenation raw oil ($C_5$-$C_9$)

| Color | Iodine value × $10^{-2}$ (g/g) | Diolefin × $10^{-2}$ (g/g) | Distillation range (° C.) | Sulfur content (ppm) | Colloid × $10^{-2}$ (mg/ml) | Density (g/ml) | Arsenic content (ppb) |
|---|---|---|---|---|---|---|---|
| Yellow | 88.5 | 39.5 | 45-205 | 86 | 7 | 0.815 | 26 |

TABLE 4

1000-hour evaluation data for catalysts of Example 2 and Comparative Example 3

| | Hydrogenation product index | | | |
|---|---|---|---|---|
| | Catalyst of Example 2 | | Catalyst of Comparative Example 3 | |
| Cumulative operation time (h) | Diolefin × $10^{-2}$ (g/g) | Iodine value × $10^{-2}$ (g/g) | Diolefin × $10^{-2}$ (g/g) | Iodine value × $10^{-2}$ (g/g) |
| 200 | 0.8 | 36.8 | 0.8 | 36.0 |
| 400 | 0.8 | 37.2 | 1.1 | 38.9 |
| 600 | 1.0 | 38.6 | 1.4 | 39.8 |
| 800 | 1.2 | 39.6 | 1.8 | 40.3 |
| 1000 | 1.4 | 40.2 | 2.5 | 43.6 |

In summary, the hydrogenation catalyst according to the present invention has good hydrogenation performance, The results of evaluation are shown in Table 4. During the 1000-hour operation, the iodine value and diolefin value of the hydrogenation product remain at low level, which sufficiently indicates that the catalyst in Example 2 has good stability and hydrogenation activity.

especially has impurity and colloid resistance as well as good hydrogenation stability. The catalyst can be applied to selective hydrogenation of diolefin unsaturated hydrocarbons, especially the first-stage selective hydrogenation process of full distillate pyrolysis gasoline.

What is claimed is:

1. A method for preparing a selective nickel-based hydrogenation catalyst, the method comprising:
adding silica or its precursor and alkaline earth metal oxide or its precursor into an alumina carrier so as to form a first mixture;
calcinating the first mixture at the temperature of 800-1100° C. for 3-6 hours to form a modified alumina carrier;
adding soluble salts of nickel, rare earth element and VIB group element into water so as to form a solution;
adjusting the pH of the solution to 4-5 following full dissolution of the soluble salts to form an impregnating solution;
impregnating the modified alumina carrier with the impregnating solution to form a second mixture;
after impregnating, drying the second mixture at the temperature of 40-120° C.; and
after drying, calcinating the second mixture at the temperature of 350-450° C. for 3-6 hours, thereby obtaining the resultant catalyst,
wherein the modified alumina carrier is prepared by:
adding silica sol, nitric acid and water into alumina hydrate so as to form a third mixture;
after kneading and extruding the third mixture, drying the third mixture at the temperature of 40-120° C.;
after drying, calcinating the third mixture at the temperature of 300-600° C. for 4-6 hours so as to form a carrier;
impregnating the carrier with an impregnating solution formed by adding alkaline earth metal oxide into water;
after impregnating, drying the carrier at the temperature of 40-120° C.; and
after drying, calcinating the carrier at the temperature of 800-1100° C. for 4-6 hours, thereby forming the modified alumina carrier.

2. The method according to claim 1, wherein the catalyst comprises a nickel oxide in the amount of 15-19%.

3. The method according to claim 1, wherein the catalyst comprises a lanthanum oxide and/or cerium oxide in the amount of 3-5%.

4. The method according to claim 1, wherein the catalyst comprises an alkaline earth metal selected from the group consisting of magnesium, strontium, and a mixture thereof.

5. The method according to claim 1, wherein the catalyst comprises an alkaline earth metal oxide in the amount of 2-5%.

6. The method according to claim 1, wherein said VIB group element is one or more selected from the group consisting of chromium, molybdenum and tungsten.

7. The method according to claim 1, wherein the VIB group element oxide in the catalyst is in the amount of 3-6%.

8. A method for preparing a selective nickel-based hydrogenation catalyst, the method comprising:
adding silica or its precursor and alkaline earth metal oxide or its precursor into an alumina carrier so as to form a first mixture;
calcinating the first mixture at the temperature of 800-1100° C. for 3-6 hours to form a modified alumina carrier;
adding soluble salts of nickel, rare earth element and VIB group element into water so as to form a solution;
adjusting the pH of the solution to 4-5 following full dissolution of the soluble salts to form an impregnating solution;
impregnating the modified alumina carrier with the impregnating solution to form a second mixture;
after impregnating, drying the second mixture at the temperature of 40-120° C.; and
after drying, calcinating the second mixture at the temperature of 350-450° C. for 3-6 hours, thereby obtaining the resultant catalyst,
wherein the resultant catalyst comprise alumina as a carrier, wherein based on the total weight of the catalyst, the catalyst comprises:
14-20% nickel oxide as an active component;
1-8% lanthanum oxide and/or cerium oxide;
1-8% VIB group element oxide as aids;
2-8% silica; and
1-8% alkaline earth metal oxide;
wherein said catalyst has a specific surface area of 60-150 m$^2$/g and a pore volume of 0.4-0.6 ml/g, and
wherein the modified alumina carrier is prepared by:
adding silica sol, nitric acid and water into alumina hydrate so as to form a third mixture;
after kneading and extruding the third mixture, drying the third mixture at the temperature of 40-120° C.;
after drying, calcinating the third mixture at the temperature of 300-600° C. for 4-6 hours so as to form a carrier;
impregnating the carrier with an impregnating solution formed by adding alkaline earth metal oxide into water;
after impregnating, drying the carrier at the temperature of 40-120° C.; and
after drying, calcinating the carrier at the temperature of 800-1100° C. for 4-6 hours, thereby forming the modified alumina carrier.

9. The method according to claim 8, wherein the nickel oxide in the catalyst is in the amount of 15-19%.

10. The method according to claim 8, wherein the lanthanum oxide and/or cerium oxide in the catalyst is in the amount of 3-5%.

11. The method according to claim 8, wherein said alkaline earth metal is magnesium and/or strontium.

12. The method according to claim 8, wherein the alkaline earth metal oxide in the catalyst is in the amount of 2-5%.

13. The method according to claim 8, wherein said VIB group element is one or more selected from the group consisting of chromium, molybdenum and tungsten.

14. The method according to claim 8, wherein the VIE group element oxide in the catalyst is in the amount of 3-6%.

* * * * *